United States Patent [19]

Hughes et al.

[11] Patent Number: 5,048,027
[45] Date of Patent: Sep. 10, 1991

[54] HYBRID LASER

[75] Inventors: John L. Hughes, Melbourne; Barry L. Hudson, Lower Templestowe, both of Australia

[73] Assignee: Austral Asian Lasers Pty. Ltd., Melbourne, Australia

[21] Appl. No.: 490,657
[22] PCT Filed: Jun. 16, 1989
[86] PCT No.: PCT/AU89/00259
§ 371 Date: Mar. 9, 1990
§ 102(e) Date: Mar. 9, 1990
[87] PCT Pub. No.: WO89/12923
PCT Pub. Date: Dec. 28, 1989

[30] Foreign Application Priority Data

Jun. 16, 1988 [AU] Australia ................................. PI8814

[51] Int. Cl.$^5$ ................................................ H01S 3/08
[52] U.S. Cl. .......................................... 372/18; 372/6; 372/66; 372/103
[58] Field of Search ....................... 372/6, 18, 66, 103

[56] References Cited

U.S. PATENT DOCUMENTS

| | | | |
|---|---|---|---|
| 4,383,318 | 5/1983 | Barry et al. | 372/6 |
| 4,627,068 | 12/1986 | Johnson et al. | 372/6 |
| 4,637,025 | 1/1987 | Snitzer et al. | 372/6 |
| 4,682,335 | 7/1987 | Hughes | 372/6 |
| 4,713,822 | 12/1987 | Lee | 372/6 |

Primary Examiner—Leon Scott, Jr.
Attorney, Agent, or Firm—Dvorak and Traub

[57] ABSTRACT

A scalable laser system system providing a single, phase-locked output which comprises a flexible bundle of single mode optical fibers with the optically polished end faces at one end being index matched via matching material to a single, partially transmitting, output mirror. The opposite end of the bundle is divided into a series of smaller bundles whose end faces are index matched to the ends of a series of solid state laser media. These are optically pumped by remotely sited laser diode arrays via additional bundles and mirrors, which are 100% reflective at the laser wave-length.

8 Claims, 5 Drawing Sheets

HYBRID LASER

FIELD OF THE INVENTION

This invention relates to a system for effectively combining the output beams of a group of rod or slab lasers into a single laser beam of comparable quality and whose power is the sum of the output powers of the individual rod and slab lasers. The invention has application in the industrial and defence fields where powerful, scaleable laser beams are deployed.

SUMMARY OF THE PRIOR ART

Prior art rod lasers have suffered from scaling problems which severely limit and eventually prohibit their operation at high power levels. Firstly, the fact that the surface of a rod laser system can be more effectively cooled than its central region leads to the well known "thermal lensing" effect which in turn leads to severe beam distortion. Secondly, as the peak power of the laser pulse propogating through a rod laser medium increases, it eventually reaches the "self-focusing" threshold within the laser medium which results in the self collapse of said pulse into a fine filament, destroying the said rod laser medium in the process. The only way to avoid laser rod damage due to self-focusing is to limit the length of said rod to less than its "self-focusing" length at a given power level. Thirdly, many excellent laser media cannot be produced in bulk and one is, therefore, limited to small rods of such laser media in any case. Where the laser medium can be produced in large quantities, such as is the case with neodymiun doped glass, self-oscillation problems arise where the parasitic lasing actions deplete the stored energy within the excited laser medium before the arrival of the laser pulse to be amplified within said excited medium. In general the same problems apply to slabs of laser media as apply to rods, although, several specific laser slab configurations can avoid laser rod induced defects.

It follows that both prior art rod and slab lasers were very limited as far as the generation of laser beam powers were concerned. The fundamental defect of both prior art rod and slab lasers could be overcome to some extent in applications where the number of laser beams used was not a limitation. For example, in laser fusion studies it is possible to use a large number of laser beams to irradiate laser fusion pellets. This situation has led to the development of large, multi-beam laser systems worldwide in an effort to overcome the power restrictions of single beam laser systems. However, simply duplicating the individual arms of rod and slab lasers to produce more laser power is not a cost effective approach to scaling laser systems to high power levels. For example, a single arm of a large laser fusion system may cost $10 m. If one needs 100 such arms the cost suddenly shoots up to $1B and this prior art approach to scaling rod and slab lasers becomes prohibitively expensive. At the other end of the scale, excellent quality neodymiun doped yttrium aluminium garnet crystals can be grown and selected, but only crystals of very small volume. Obviously it is beneficial to combine the outputs of a series of such high quality crystalline lasers into a single beam format. However, prior art beam combining techniques cannot produce a single beam of similar quality whose total power is the sum of the power out of the individual crystal lasers.

The present invention overcomes the defects of prior art beam combining systems in that it automatically provides a single, scaleable, laser beam of similar, if not superior quality to that of the individual laser beams which it replaces. The invention achieves its superiority over prior art systems by coupling individual rod or slab laser media into a common scaleable output aperture using bundles of passive single mode optical fibres. The invention represents a parallel array of laser oscillators which have one common output aperture, the laser medium being represented by laser rods or slabs with the remainder of the resonant cavity between the laser mirrors being filled with coherently packed, passive bundles of single mode optical fibre whose cladding thickness should be comparable to or less than the fibre core diameter. However, the invention will still operate even if the fibre cladding thickness is much greater than the fibre core diameter but the laser medium will not be optimally utilized under these conditions.

BACKGROUND OF THE INVENTION

Soon after the advent of the laser in 1960, one of the inventors (John Leonard Hughes) proposed its use in particle physics (Hughes, Nature 1963). However, the peak powers required to achieve such a goal in particle physics are very large ($>10^{15}$ watts) and an intensive effort has been underway since that time to adapt both solid state slab and fibre bundle based lasers for the generation of powerful laser beams (see Hughes U.S. Pat. Nos. 4,039,962 (1977) and 4,132,955 (1979)) and Hughes Laser Radar Patents (classified U.S., UK and Australia).

In this invention we have combined the advantages of rod and slab lasers with those of passive, phased-locked fibre bundles. The first of these hybrid lasers was operated by one of us (JLH) in 1986 in its simplest format when one million laser oscillators were fired simultaneously. The fibre technology of the invention would be significantly enhanced by the use of multicolored optical fibres which effectively reduce the cladding thickness relative to the diameter of the fibre cores leading to a higher degree of utilization of the rod and slab laser medium of the invention as well as a much more compact fibre bundle for a given output power.

SUMMARY OF THE INVENTION

It is an object of the invention to combine the output beams of a plurality of rod lasers into a single laser beam of comparable quality.

It is also an object of the invention to combine the output beams of a plurality of slab lasers into a single laser beam of comparable quality.

It is an object of the invention to provide a flexible output end for a scaleable solid state laser.

Another object of the invention is to distribute the electrical and thermal loadings in a solid state laser so that they can be effectively managed as the laser input power is increased.

Yet another object of the invention is to allow very high quality rod and slab sections of laser media to be used to produce a single powerful laser beam which would not otherwise be possible.

It is also an object of the invention to extract more laser beam energy from a given volume of laser rod and slab media at high quality laser beam output than would otherwise be possible with prior art rod and slab laser media which would operate under multimode conditions at the equivalent power levels.

Yet another object of the invention is to enhance the phase-locking of a plurality of laser media by using bundles of optical fibre to optically couple said media to a level where mutual phase-locking effect will occur.

It is an object of the invention to provide bundles of equal lengths of fibres whose end faces are polished to a twentieth of the laser wavelength or better.

The invention combines the advantages of rod and slab lasers with the scaling properties of fibre optical bundles which also provide a high degree of flexible laser oscillator structure which allows for the mounting of said invention within industrial workstations without the need for multiple mirror articulated arms to guide the laser beam to, for example, a workpiece. The optical path lengths within the laser oscillator can be equalized via various fibre paths by using index matching media at the interfaces between the rod end faces and the fibre bundle end faces as well as the interface between the fibre bundle and the output mirror.

BRIEF DESCRIPTION OF THE SEVERAL VIEWS OF THE DRAWINGS

A better understanding of the invention will be gained from the following descriptions taken in conjunction with the accompanying drawings. It is emphasized that the ensuing teachings are exemplary and are not limitative to the scope and applicability of the invention.

In the drawings.

DETAILED DESCRIPTION

Figure 1:
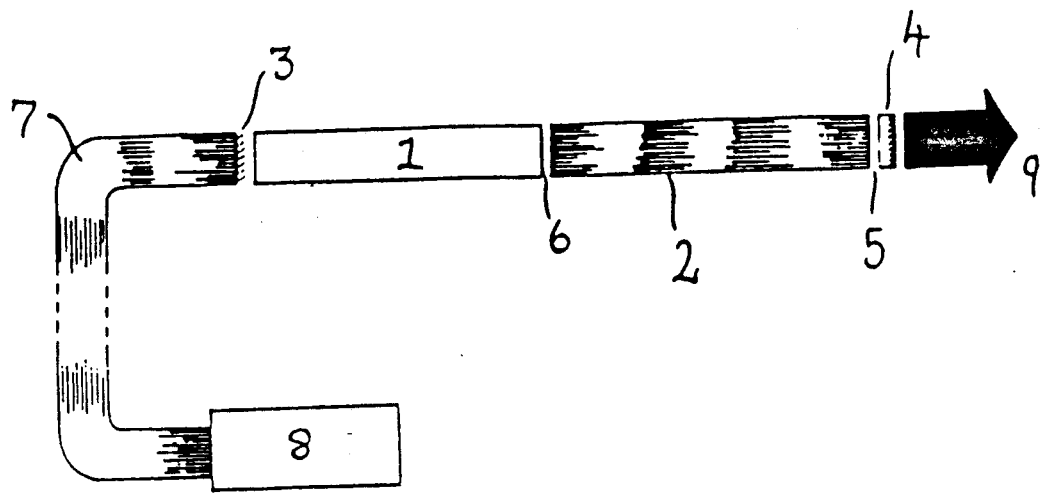
FIG. 1 is schematic layout of a single element of the invention consisting of a laser oscillator cavity containing a laser rod (or slab) and a single mode optical fibre bundle which are index-matched. The laser rod is end (or side) excited from a remotely sited diode laser optical power supply which is optical fibre bundle coupled to said element of the invention.

In FIG. 1, numeral 1 indicates the laser medium which may be in a rod or a slab format.

Numeral 2 indicates a bundle of single mode optical fibres whilst numerals 3 and 4 respectively indicate the laser resonator mirrors with mirror 3 being totally reflecting at the laser wavelength whilst mirror 4 is partially transmitting. Numeral 5 indicates an index matching medium between the laser medium 1 and the fibre bundle ends 5.

In FIG. 1, numeral 7 indicates a bundle of optical fibres used to convey optical power from the remotely sited diode laser array indicated by numeral 8 to excite laser medium 1.

Numeral 9 indicates the phase-locked output laser beam of the invention.

Figure 2:
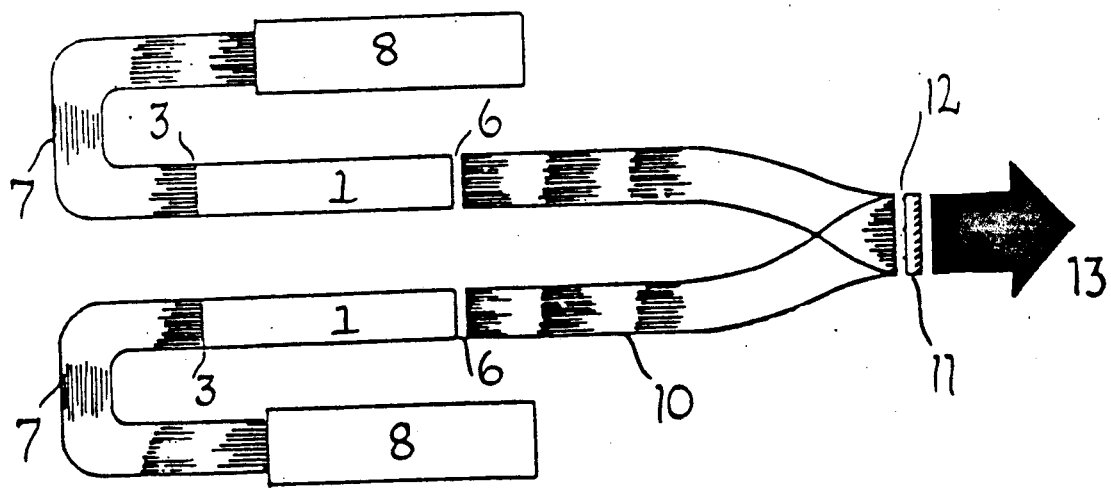
FIG. 2 is a schematic layout of a plurality of elements of the invention with a common output aperture.

In FIG. 2, numeral 10 indicates a single mode fibre bundle which consists of one optical polished end composed of all the fibre ends and a series of other opposite end faces each composed of fewer fibre ends. A plurality of laser oscillators is now formed by matching the multiple ends of said fibre bundle to a series of laser media. Numeral 11 indicates a single output mirror for the plurality of laser oscillators whilst numeral 12 indicates the index matching medium.

Numeral 13 indicates the single phase-locked output coupled from the plurality of laser media 1.

Figure 3:
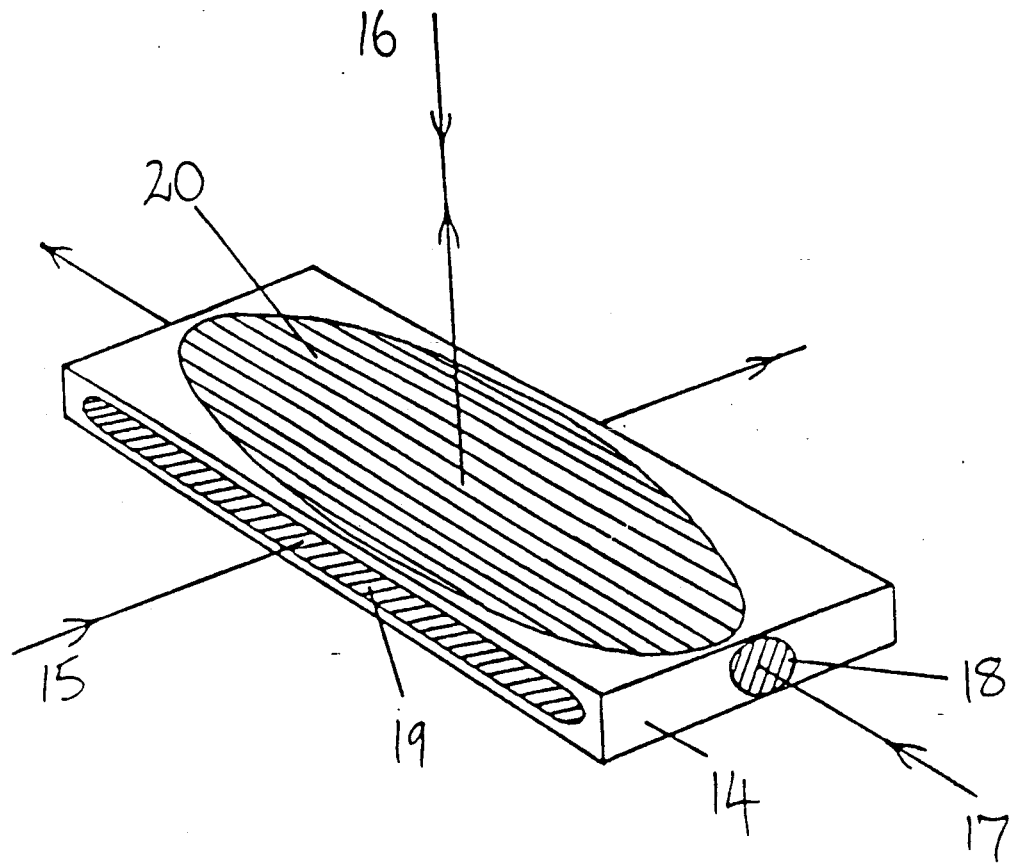
FIG. 3 shows the three modes of operation of slab lasers.

In FIG. 3, numeral 14 indicates the smallest face of a slab laser medium, numeral 15 indicates the next largest face of said slab whilst numeral 16 indicates the largest face of the slab.

Numeral 17 indicates the direction of propogation of a laser beam through the small end face 14 whilst numeral 18 indicates a laser beam of circular cross-section that can pass through the slab along direction 17. Numeral 19 indicates a laser beam of elliptical cross-section that can propogate through the slab along direction 15. Numeral 20 indicates the largest elliptical cross-section laser beam that can propogate through the slab along direction 16. Any of these three slabs laser structures can form the active part of the single element of the invention.

Figure 4:
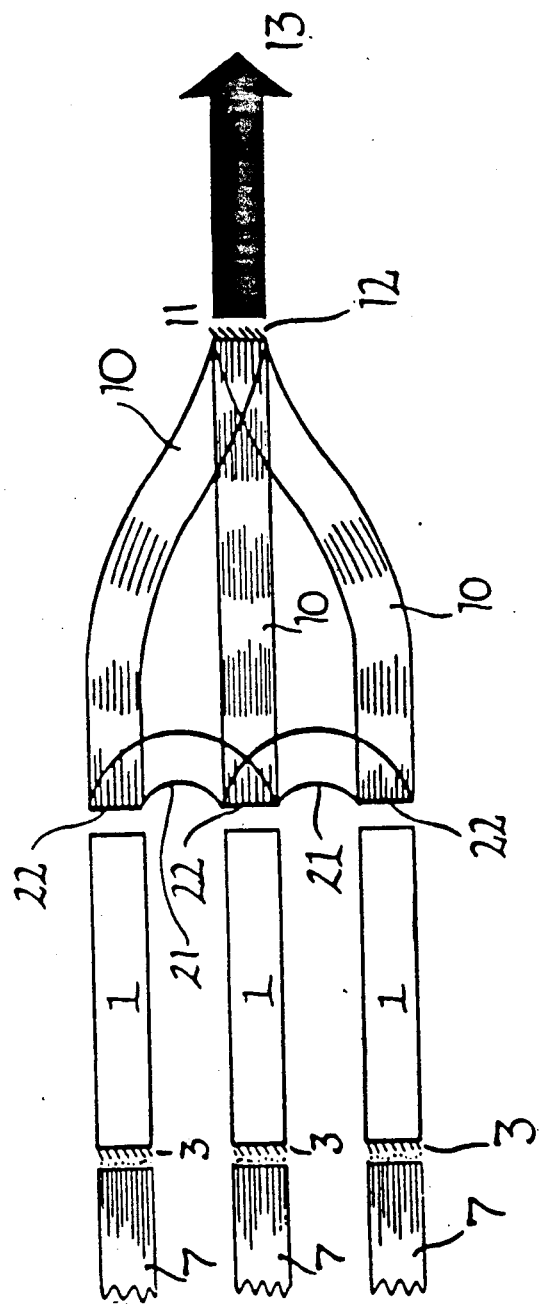
FIG. 4 is a schematic layout of the invention showing a plurality of its elements interconnected with additional fibre bundles.

In FIG. 4, numeral 21 indicates additional fibre bundles that can be used to enhance the phase-locking of a plurality of laser media 1 of the invention, said single mode fibre bundles 21 being interfaced with fibre bundles 10 as indicated by numeral 22.

Figure 5:
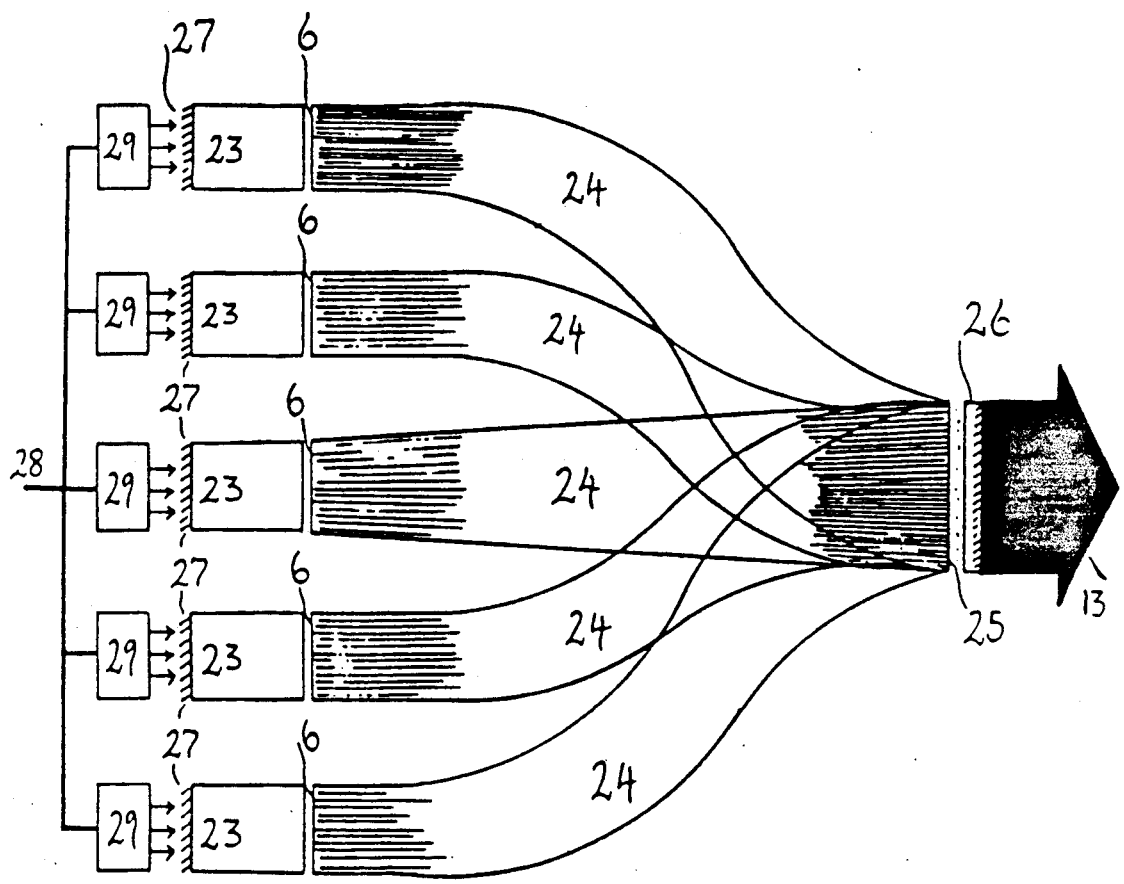
FIG. 5 is a schematic layout of the invention using a plurality of slab laser media.

In FIG. 5, numeral 23 indicates a slab laser media used in the element of the invention whilst numeral 24 indicates fibre bundles of rectangular cross-section combined into a single aperture of circular cross-section indicated by numeral 25 with an output mirror of circular cross-section indicated by numeral 26. Numeral 27 indicates 100% reflecting mirror at the laser wavelength which is of rectangular cross-section. Numeral 8 indicates the lead which connects diode arrays 9 to a power supply not shown.

Figure 6:
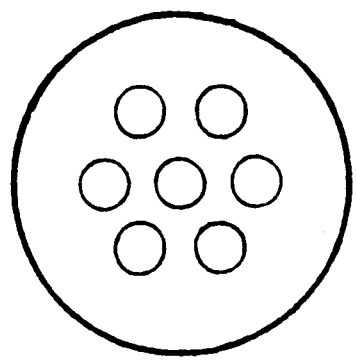
FIG. 6 shows a multicolored fibre of the invention with all fibres equally spaced in a fibre of circular cross-section.

In FIG. 6, numeral 30 indicates a single mode core of a multicolored fibre of circular cross-section indicated by numeral 31.

Figure 7:
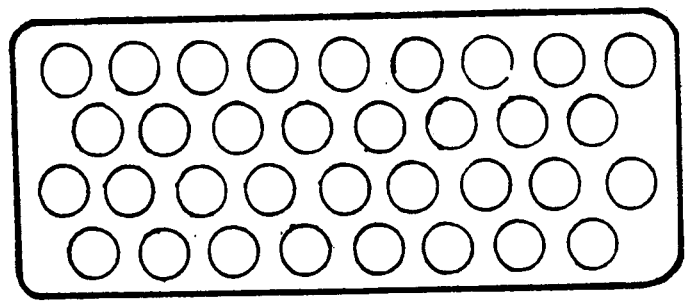
FIG. 7 shows a multicolored fibre used in the invention with a rectangular cross-section with all fibres equally spaced.

FIG. 7 shows a multicore optical fibre of rectangular cross-section with numeral 32 indicating the single mode core and numeral 33 indicating their common cladding.

The invention has application in the industrial, medical and defence fields where a scaleable laser beam output is required. The invention has a flexible output section represented by the fibre bundle which for example, allows its use of robotic arms without the need for beam deflecting mirrors.

We claim:

1. A scaleable laser system comprising:
   a laser resonator,
   a first laser resonator end mirror arranged and constructed to fully reflect at a lasing wavelength and to fully transmit at a laser pump wavelength,
   a second laser resonator end mirror arranged and constructed to partially transmit at a lasing wavelength and fully reflect at a laser pump wavelength,
   a laser medium,
   a first optically polished end face of said laser medium disposed adjacent said first resonator end mirror, a first bundle of single mode optical fibers having a first optical fiber end and a second optical fiber end, said first and said second optical fiber ends being optically polished and index matched to said laser medium and said laser resonator, a second optically polished end face of said laser medium disposed opposite said first end face, said second end face being index matched to said first bundle of single mode optical fibers, a second fiber bundle coupled to an outside face of said first end mirror, said second fiber bundle arranged and constructed to convey light from a remotely cited power supply to said laser medium, whereby said laser resonator is phase locked and optically coupled by the index matching of said first fiber bundle and laser medium to said resonator mirrors.

2. A scaleable laser system according to claim 1, wherein said laser medium is a rod configuration.

3. A scaleable laser system according to claim 1, wherein said laser medium is a slab configuration.

4. A scaleable laser system according to claim 1, wherein excitation light from said remotely sited power supply is continuous.

5. A scaleable laser system according to claim 1, wherein excitation light from said remotely sited optical power supply is pulsed.

6. A scaleable laser system according to claim 1, wherein said single mode fibers are multi-cored.

7. A scaleable laser system according to claim 1, further comprising a plurality of said scaleable laser systems having output apertures combined into a single aperture of fiber ends positioned adjacent a single mirror.

8. A scaleable laser system according to claim 7, further comprising additional optical fibers interconnecting said laser media, said additional optical fibers arranged and constructed to enhance synchronous phase locking of said laser medium.

* * * * *